US008670500B2

(12) United States Patent
Ihm et al.

(10) Patent No.: US 8,670,500 B2
(45) Date of Patent: Mar. 11, 2014

(54) DATA TRANSMITTING AND RECEIVING METHOD USING PHASE SHIFT BASED PRECODING AND TRANSCEIVER SUPPORTING THE SAME

(75) Inventors: Bin Chul Ihm, Gyeonggi-do (KR); Wook Bong Lee, Gyeonggi-do (KR); Moon Il Lee, Gyeonggi-do (KR); Jin Young Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 13/109,963

(22) Filed: May 17, 2011

(65) Prior Publication Data
US 2011/0280291 A1    Nov. 17, 2011

Related U.S. Application Data

(63) Continuation of application No. 12/678,200, filed as application No. PCT/KR2008/005423 on Sep. 12, 2008, now Pat. No. 7,970,074.

(30) Foreign Application Priority Data

Sep. 19, 2007  (KR) .................. 10-2007-0095279
Jun. 20, 2008  (KR) .................. 10-2008-0058654

(51) Int. Cl.
*H04L 27/06* (2006.01)
*H04L 27/04* (2006.01)

(52) U.S. Cl.
USPC .......................................... 375/295; 375/316

(58) Field of Classification Search
USPC ......... 375/260, 267, 295–296, 299, 316, 340, 375/346–347, 349; 370/328–329, 334, 350
See application file for complete search history.

(56) References Cited

U.S. PATENT DOCUMENTS 6,298,092 B1   10/2001   Heath, Jr. et al.
6,631,347 B1   10/2003   Kim et al.
(Continued)

FOREIGN PATENT DOCUMENTS

CN    1756119    4/2006
CN    1801665    7/2006
(Continued)

OTHER PUBLICATIONS

Berder O., et al., "Optimal Minimum Distance-Based Precoder for MIMO Spatial Multiplexing Systems", IEEE Transactions on Signal Processing, Mar. 1, 2004, vol. 52, No. 03, pp. 617-627, XP011107796.

(Continued)

*Primary Examiner* — Khanh C Tran
(74) *Attorney, Agent, or Firm* — Lee, Hong, Degerman, Kang & Waimey

(57) ABSTRACT

A method for performing a precoding based on a generalized phase shift or a precoding based on an extended phase shift in a Multi-Input Multi-Output (MIMO) system employing several sub-carriers, and a transceiver for supporting the same are disclosed. A phase-shift-based precoding matrix is generalized by multiplying a diagonal matrix for a phase shift by a unitary matrix for maintaining orthogonality between sub-carriers. In this case, a diagonal matrix part may be extended by multiplying a precoding matrix for removing an interference between sub-carriers by a diagonal matrix for a phase shift. By generalization and extension of the phase-shift-based precoding, a transceiver is more simplified, and a communication efficiency increases.

12 Claims, 8 Drawing Sheets

(56) References Cited

U.S. PATENT DOCUMENTS

| | | |
|---|---|---|
| 6,760,882 B1 | 7/2004 | Gesbert et al. |
| 6,891,897 B1 | 5/2005 | Bevan et al. |
| 7,095,800 B2 | 8/2006 | Schenk |
| 7,583,747 B1 | 9/2009 | Damen et al. |
| 7,583,982 B2 | 9/2009 | Olesen et al. |
| 7,609,613 B2 | 10/2009 | Aghvami et al. |
| 7,620,019 B1 | 11/2009 | Smith et al. |
| 7,636,297 B1 | 12/2009 | Lee et al. |
| 7,702,029 B2 | 4/2010 | Kotecha et al. |
| 7,729,432 B2 | 6/2010 | Khan et al. |
| 7,813,330 B2 | 10/2010 | Yu et al. |
| 7,839,835 B2 * | 11/2010 | Khojastepour et al. ....... 370/343 |
| 7,839,944 B2 | 11/2010 | Lee et al. |
| 7,899,132 B2 | 3/2011 | Lee et al. |
| 8,259,824 B2 * | 9/2012 | Varadarajan et al. ......... 375/260 |
| 2003/0048753 A1 | 3/2003 | Jalali |
| 2003/0147343 A1 | 8/2003 | Onggosanusi et al. |
| 2004/0001540 A1 | 1/2004 | Jones |
| 2004/0136349 A1 | 7/2004 | Walton et al. |
| 2004/0192218 A1 | 9/2004 | Oprea |
| 2005/0041751 A1 | 2/2005 | Nir et al. |
| 2005/0201307 A1 | 9/2005 | Chae et al. |
| 2005/0281350 A1 | 12/2005 | Chae et al. |
| 2006/0013186 A1 | 1/2006 | Agrawal et al. |
| 2006/0013328 A1 | 1/2006 | Zhang et al. |
| 2006/0039489 A1 | 2/2006 | Ikram et al. |
| 2006/0039500 A1 | 2/2006 | Yun et al. |
| 2006/0067277 A1 | 3/2006 | Thomas et al. |
| 2006/0067443 A1 | 3/2006 | Liu et al. |
| 2006/0093062 A1 | 5/2006 | Yun et al. |
| 2006/0098568 A1 | 5/2006 | Oh et al. |
| 2006/0098760 A1 | 5/2006 | Shen et al. |
| 2006/0140294 A1 | 6/2006 | Hottinen et al. |
| 2006/0146692 A1 | 7/2006 | Gorokhov et al. |
| 2006/0182206 A1 | 8/2006 | Coon et al. |
| 2006/0270360 A1 | 11/2006 | Han et al. |
| 2007/0041457 A1 | 2/2007 | Kadous et al. |
| 2007/0041464 A1 | 2/2007 | Kim et al. |
| 2007/0097856 A1 | 5/2007 | Wang et al. |
| 2007/0133707 A1 | 6/2007 | Hwang et al. |
| 2007/0147543 A1 | 6/2007 | Horng et al. |
| 2007/0149180 A1 | 6/2007 | Lin et al. |
| 2007/0165738 A1 | 7/2007 | Barriac et al. |
| 2007/0189416 A1 | 8/2007 | Kim et al. |
| 2007/0263746 A1 | 11/2007 | Son |
| 2007/0280373 A1 | 12/2007 | Lee et al. |
| 2007/0286302 A1 | 12/2007 | Hwang et al. |
| 2007/0291638 A1 | 12/2007 | Chae et al. |
| 2007/0297529 A1 | 12/2007 | Zhou et al. |
| 2008/0063115 A1 | 3/2008 | Varadarajan et al. |
| 2008/0069031 A1 | 3/2008 | Zhang et al. |
| 2008/0080637 A1 | 4/2008 | Khan et al. |
| 2008/0108310 A1 | 5/2008 | Tong et al. |
| 2008/0198946 A1 | 8/2008 | Lee et al. |
| 2008/0205533 A1 | 8/2008 | Lee et al. |
| 2008/0232503 A1 | 9/2008 | Kim |
| 2008/0240274 A1 | 10/2008 | Han et al. |
| 2008/0247364 A1 | 10/2008 | Kim et al. |
| 2008/0256163 A1 | 10/2008 | Clerckx et al. |
| 2008/0303699 A1 | 12/2008 | Zhang et al. |
| 2009/0003466 A1 | 1/2009 | Taherzadehboroujeni et al. |
| 2009/0003485 A1 | 1/2009 | Li et al. |
| 2009/0110114 A1 | 4/2009 | Onggosanusi et al. |
| 2009/0296844 A1 | 12/2009 | Ihm et al. |
| 2009/0316807 A1 | 12/2009 | Kim et al. |
| 2010/0027696 A1 | 2/2010 | Lee et al. |
| 2010/0074309 A1 | 3/2010 | Lee et al. |
| 2010/0118997 A1 | 5/2010 | Lee et al. |
| 2010/0202500 A1 | 8/2010 | Ihm et al. |
| 2011/0150129 A1 | 6/2011 | Kwon et al. |

FOREIGN PATENT DOCUMENTS

| | | |
|---|---|---|
| CN | 101026433 | 8/2007 |
| CN | 101166052 | 4/2008 |
| EP | 0771084 | 5/1997 |
| EP | 1087545 | 3/2001 |
| EP | 1538772 | 6/2005 |
| EP | 1655874 | 5/2006 |
| JP | 2003018127 | 1/2003 |
| JP | 2004503993 | 2/2004 |
| JP | 2004135342 | 4/2004 |
| JP | 2005509316 | 4/2005 |
| JP | 2005521358 | 7/2005 |
| JP | 2006141013 | 6/2006 |
| JP | 2006-222742 | 8/2006 |
| JP | 2007195129 | 8/2007 |
| JP | 2007-529972 | 10/2007 |
| JP | 2007538423 | 12/2007 |
| JP | 2007538466 | 12/2007 |
| JP | 2008510417 | 4/2008 |
| JP | 2008528102 | 7/2008 |
| JP | 2009-506656 | 2/2009 |
| JP | 2009538555 | 11/2009 |
| JP | 2009538556 | 11/2009 |
| JP | 2010-519794 | 6/2010 |
| KR | 10-2006-0028989 | 4/2006 |
| KR | 10-2006-0038812 | 5/2006 |
| KR | 10-2006-0064501 | 6/2006 |
| KR | 10-2006-0130062 | 12/2006 |
| KR | 10-0715582 | 4/2007 |
| KR | 1020070068300 | 6/2007 |
| KR | 10-2008-0036499 | 4/2008 |
| KR | 10-0918747 | 9/2009 |
| RU | 2238611 | 10/2004 |
| RU | 2005-101422 | 8/2005 |
| RU | 2005101422 | 8/2005 |
| RU | 2351071 | 1/2006 |
| RU | 2005115857 | 1/2006 |
| RU | 2292116 | 1/2007 |
| TW | 589818 | 6/2004 |
| TW | 200611519 | 4/2006 |
| WO | 02/39590 | 5/2002 |
| WO | 2004-038952 | 5/2004 |
| WO | 2004/064311 | 7/2004 |
| WO | 2004073224 | 8/2004 |
| WO | 2005/099211 | 10/2005 |
| WO | 2005-122516 | 12/2005 |
| WO | 2005/125044 | 12/2005 |
| WO | 2005/125140 | 12/2005 |
| WO | 2006002550 | 1/2006 |
| WO | 2006/019253 | 2/2006 |
| WO | 2006019250 | 2/2006 |
| WO | 2006/049417 | 5/2006 |
| WO | 2006049417 | 5/2006 |
| WO | 2006/069271 | 6/2006 |
| WO | 2006/118081 | 11/2006 |
| WO | 2007/024935 | 3/2007 |
| WO | 2007/051208 | 5/2007 |
| WO | 2007/070313 | 6/2007 |
| WO | 2007094832 | 8/2007 |

OTHER PUBLICATIONS

Chang S., et al., "Asymptotically Minimum BER Linear Block Precoders for MMSE Equalisation", IEEE Proceedings: Communications, Jun. 29, 2004, vol. 151, No. 4, pp. 297-304, XP006022313.

Zhang, J., "MIMO Wireless Precoding System Robust to Power Imbalance," U.S. Appl. No. 60/929,025, filed Jun. 8, 2007.

Athaudage, C.R.N., et al.; "An Efficient Framework to Exploit Frequency Diversity in OFDM: Precoding With Adaptive Subcarrier Selection"; The 17th Annual IEEE Int'l Symposium on Personal, Indoor, Mobile Radio Communications; Sep. 11, 2006.

Wang, J., et al.; "Method and Apparatus for Pre-Coding"; U.S. Appl. No. 60/731,301, filed Oct. 28, 2005.

NTT Docomo, "Multi-Degree Cyclic Delay Diversity with Frequency-Domain Channel Dependent Scheduling", R1-062107, 3GPP TSG RAN WG1 Meeting #46, Aug. 28, 2006.

(56) References Cited

OTHER PUBLICATIONS

Samsung, "Further details on adaptive cyclic delay diversity scheme", R1-051046, 3GPP TSG RAN WG1 Meeting #42bis, Oct. 10, 2005.
Samsung, "System performance of adaptive cyclic delay diversity scheme", R1-051047, 3GPP TSG RAN WG1 Meeting #42bis, Oct. 10, 2005.
NTT Docomo, "Multi-Degree Cyclic Delay Diversity with Frequency-domain Channel Dependent Scheduling", R1-060991, 3GPP TSG RAN WG1 Meeting #44bis, Mar. 26, 2006.
NTT Docomo, "Channel Dependent Scheduling with Cyclic Delay Diversity", R1-061192, 3GPP TSG RAN WG1 Meeting #45, May 8, 2006.
Ericsson, "Phase Shift based Precoding for Downlink MIMO Transmission", R1-071032, 3GPP TSG RAN WG1 #48, Feb. 12, 2007.
NTT Docomo, "CDD-Based Pre-coding Scheme for Rank = 1 and 2", R1-062732, 3GPP TSG RAN WG1 Meeting #46bis, Oct. 9, 2006.
LG Electronics, "Generalized CDD scheme for E-UTRA downlink MIMO", R1-062314, 3GPP TSG RAN WG1 Meeting #46, Aug. 28, 2006.
LG Electronics, et al., "CDD-based Precoding for E-UTRA downlink MIMO", R1-063345, 3GPP TSG RAN WG1 Meeting #47, Nov. 6, 2006.
LG Electronics, et al., "CDD-based Precoding for Open-loop E-UTRA downlink MIMO," R1-063346, 3GPP TSG RAN WG1 Meeting #47, Nov. 6, 2006.
ETRI, "Combined spatial multiplexing and CSD transmission for rate 2 with 4 transmit antennas," R1-060828, 3GPP TSG RAN WG1 Meeting #44bis, Mar. 27, 2006.
Bauch et al., "Orthogonal Frequency Division Multiple Access with Cycile Delay Diversity", IEEE ITG Workshop on Smart Antennas, pp. 17-24, Mar. 2004.
LG Electronics, "Link Evaluation of DL SU-MIMO—Impact of Generalized CDD," R1-062566, 3GPP TSG RAN WG1 Meeting #46bis, Oct. 2006.
Ericsson, "High Delay CDD in Rank Adapted Spatial Multiplexing Mode for LTE DL," R1-071601, 3GPP TSG RAN WG1 # 48bis, Mar. 2007.
NTT Docomo: "Multi-Degree Cyclic Delay Diversity with Frequency-domain Channel Dependent Scheduling", R1-062107, 3GPP TSG RAN WG1 Meeting #46, Aug. 2006.
NTT DoCoMo, et al., "Investigation on Optimum Number of Codewords for MIMO Multiplexing in E-UTRA Downlink," R1-062106, 3GPP TSG RAN WG1 Meeting #46, Aug. 2006, 7 pages.
LG Electronics, "Generalized CDD Scheme with Channel Dependent Scheduling," R1-062315, 3GPP TSG RAN WG1 Meeting #46, Aug. 2006, 7 pages.
LG Electronics, "Precoding scheme with ACDD for 2tx and rank 1," R1-062317, 3GPP TSG RAN WG1 Meeting #46, Aug. 2006, 3 pages.
LG Electronics, "Precoding scheme for 2 Tx antenna system," R1-062316, 3GPP TSG RAN WG1 Meeting #46, Aug. 2006, 3 pages.
Samsung, et al., "Further Considerations of CDD Precoding for High-speed UEs," R1-073566, 3GPP TSG RAN WG1 Meeting #50, Aug. 2007, 6 pages.
Ericsson, "Precoding Considerations in LTE MIMO Downlink," R1-071044, TSG-RAN WG1 #48, Feb. 2007, 8 pages.
Ericsson, "CQI delay impact on codebook based precoding for E-UTRA DL 2×2 system," R1-071043, 3GPP TSG RAN WG1 #48, Feb. 2007, 5 pages.
European Patent Office Application Serial No. 09169902.5, Search Report dated Mar. 13, 2013, 7 pages.
S. Sun et al., "Precoding for Asymmetric MIMO-OFDM Channels", IEEE International Conference on Communications, vol. 7, pp. 3117-3122, Jun. 2006.
LG Electronics, "CDD-based Precoding for Open-loop SM in E-UTRA downlink", R1-073495, 3GPP TSG RAN WG1 Meeting #50, Aug. 2007.
Samsung, "MIMO precoding for E-UTRA Downlink", R1-070944, 3GPP TSG RAN WG1 Meeting #48, Feb. 2007.
NTT DoCoMo et al., "Investigation on Frequency Granularity of SU-MIMO Precoding in E-UTRA Downlink", R1-073707, 3GPP TSG RAN WG1 Meeting #50, Aug. 2007.
Motorola, "Four Antenna Precoding Codebook for EUTRA MIMO Downlink", R1-071439, 3GPP TSG RAN WG1 Meeting #48bis, Mar. 2007.
Ericsson, "Realizing Codebook Subset Restriction", R1-073734, 3GPP TSG-RAN WG1 #50, Aug. 2007.
QUALCOMM Europe, "Link Analysis of HH and DFT Based Precoding for 4 Tx Antennas", R1-072021, 3GPP TSG-RAN WG1 #49, May 2007.
Texas Instruments, "Precoding Codebook Design for 4 Node-B Antenna", R1-070730, 3GPP TSG RAN WG1#48, Feb. 2007.
Texas Instruments et al., "Proposed Way Forward on Codebook Design for E-UTRA", R1-070728, 3GPP TSG RAN WG1 48, Feb. 2007.
Jihoon Choi et al: "Interpolation based unitary precoding for spatial multiplexing MIMO-OFDM with limited feedback", Global Telecommunications Conference, Nov. 2004, pp. 214-218, XP010758883.
Qinghua Li et al: "Compact Feedback for MIMO-OFDM Systems over Frequency Selective Channels", IEEE 61st Vehicular Technology Conference, May 2005, pp. 187-191, XP010855378.
Chen et al., "Precoded FIR and Redundant V-BLAST Systems for Frequency-Selective MIMO Channels", IEEE Transactions on Signal Processing, vol. 55, No. 7, p. 3390-3404, Jul. 2007.
Lee et al., "A New Transmit Diversity Scheme based on Cyclic Precoding Vectors for Flat Fading Channels", p. 2238-2242, 2007.
Nortel, "Closed Loop-MIMO Pre-coding and Feedback Design", R1-060659, 3GPP TSG-RAN Working Group 1 Meeting #44, Feb. 2006.
QUALCOMM Europe, "Precoding Details for DL MIMO", R1-070434, 3GPP TSG-RAN WG1 #47bis, Jan. 2007.
Taiwan Intellectual Property Office Application Serial No. 096135053, Office Action dated May 9, 2013, 5 pages.
Texas Instruments, et al., "Way Forward on 4-Tx Antenna Codebook for SU-MIMO," 3GPP TSG RAN WG1 49bis, R1-072843, Jun. 2007, 4 pages.
Texas Instruments, "Remaining Details of SU-MIMO for E-UTRA," 3GPP TSG RAN WG1 50, R1-073845, Aug. 2007, 6 pages.

* cited by examiner

DATA TRANSMITTING AND RECEIVING METHOD USING PHASE SHIFT BASED PRECODING AND TRANSCEIVER SUPPORTING THE SAME

This application is a continuation of U.S. patent application Ser. No. 12/678,200, filed on Mar. 15, 2010, now U.S. Pat. No. 7,970,074, which is the National Stage filing under 35 U.S.C. 371 of International Application No. PCT/KR2008/005423, filed on Sep. 12, 2008, which claims the benefit of earlier filing date and right of priority to Korean Patent Application Nos. 10-2007-0095279, filed on Sep. 19, 2007, and 10-2008-0058654, filed on Jun. 20, 2008, the contents of which are all hereby incorporated by reference herein in their entirety.

TECHNICAL FIELD

The present invention relates to a method for performing a precoding based on a generalized phase shift or a precoding based on an extended phase shift, and a transceiver for supporting the same, and relates to a method for transmitting and receiving data using a precoding, in a Multi-Input Multi-Output (MIMO) system using a plurality of sub-carriers.

BACKGROUND ART

In recent times, with the increasing development of information communication technologies, a variety of multimedia services, and a variety of high-quality services have been developed and introduced to the market, so that demands of wireless communication services are rapidly increasing throughout the world. In order to actively cope with the increasing demands, capacity of a communication system must be increased.

A variety of methods for increasing communication capacity under wireless communication have been considered, for example, a method for searching for a new available frequency band in all frequency bands, and a method for increasing efficiency of limited resources. As representative examples of the latter method, a transceiver includes a plurality of antennas to guarantee an additional space utilizing resources so that a diversity gain is acquired, or MIMO communication technologies for increasing transmission capacity by transmitting data via individual antennas in parallel have been developed by many companies or developers.

Particularly, a Multiple-Input Multiple-Output (MIMO) system based on an Orthogonal Frequency Division Multiplexing (OFDM) from among the MIMO communication technologies will hereinafter be described with reference to FIG. 1.

FIG. 1 is a block diagram illustrating an OFDM system equipped with multiple transmission/reception (Tx/Rx) antennas.

Referring to FIG. 1, in a transmission end, a channel encoder 101 attaches a redundant bit to a Tx data bit to reduce a negative influence of a channel or noise. A mapper 103 converts data bit information into data symbol information. A serial-to-parallel (S/P) converter 105 converts the data symbol into a parallel data symbol so that the parallel data symbol can be loaded on several sub-carriers. A MIMO encoder 107 converts the parallel data symbol into space-time signals.

In a reception end, a MIMO decoder 109, a parallel-to-serial (P/S) converter 111, a demapper 113, and a channel decoder 115 have functions opposite to those of the MIMO encoder 107, the S/P converter 105, the mapper 103, and the channel encoder 101 in the transmission end.

The MIMO OFDM system requires a variety of technologies for increasing a Tx reliability of data, for example, a Space-Time Code (STC) or Cyclic Delay Diversity (CDD) scheme to increase a spatial diversity gain, and a BeamForming (BF) or Precoding scheme to increase a Signal-to-Noise Ratio (SNR). In this case, the STC or CDD scheme has been used to increase a Tx reliability of an open-loop system which is incapable of using feedback information at a transmission end, and the BF or Precoding scheme has been used to maximize the SNR using corresponding feedback information of a closed-loop system which is capable of using feedback information at a transmission end.

Particularly, the CDD scheme for increasing the spatial diversity gain and the precoding scheme for increasing the SNR will hereinafter be described in detail.

When a system equipped with multiple Tx antennas transmits OFDM signals, the CDD scheme allows all the antennas to transmit the OFDM signals having different delays or amplitudes, so that a reception end can acquire a frequency diversity gain.

FIG. 2 is a block diagram illustrating a transmission end of a MIMO system based on the CDD scheme.

Referring to FIG. 2, an OFDM symbol is distributed to individual antennas via the S/P converter and the MIMO encoder, a Cyclic Prefix (CP) for preventing an interference between channels is attached to the OFDM symbol, and then the resultant OFDM symbol with the CP is transmitted to a reception end. In this case, a data sequence transmitted to a first antenna is applied to the reception end without any change, and the other data sequence transmitted to a second antenna is cyclic-delayed by a predetermined number of samples as compared to the first antenna, so that the cyclic-delayed data sequence is transmitted to the second antenna.

In the meantime, if the CDD scheme is implemented in a frequency domain, a cyclic delay may be denoted by a product (or multiplication) of phase sequences. A detailed description thereof will hereinafter be described with reference to FIG. 3.

FIG. 3 is a block diagram illustrating a transmission end of a MIMO system based on a conventional phase shift diversity (PSD) scheme.

Referring to FIG. 3, different phase sequences (Phase Sequence 1~Phase Sequence M) of individual antennas are multiplied by individual data sequences in a frequency domain, an Inverse Fast Fourier Transform (IFFT) is performed on the multiplied result, and the IFFT-multiplied data is transmitted to a reception end. The above-mentioned method of FIG. 3 is called a phase shift diversity scheme.

In the case of using the phase shift diversity scheme, a flat fading channel may be changed to a frequency-selective channel, a frequency diversity gain may be acquired, by a channel encoding process, or a multi-user diversity gain may be acquired by a frequency-selective scheduling process.

In the meantime, if a closed-loop system includes finite feedback information, two precoding schemes may be used, i.e., a coodbook-based precoding scheme and a scheme for quantizing channel information and feeding back the quantized channel information. The codebook-based precoding scheme feeds back an index of a precoding matrix, which has been recognized by transmission/reception ends, to the transmission/reception ends, so that it can acquire a SNR gain.

FIG. 4 is a block diagram illustrating the transmission/reception ends of a MIMO system based on the codebook-based precoding.

Referring to FIG. 4, each of the transmission/reception ends has a finite precoding matrix ($P_1$~$P_L$). The reception end feeds back an optimum precoding matrix index (l) to the transmission end using channel information, and the transmission end applies a precoding matrix corresponding to the feedback index to transmission data ($\chi_1 \sim \chi_{Mt}$). For reference, the following Table 1 shows an exemplary codebook used when feedback information of 3 bits is used in an IEEE 802.16e system equipped with two Tx antennas to support a spatial multiplex rate of 2.

TABLE 1

| Matrix Index (binary) | Column 1 | Column 2 | Matrix Index (binary) | Column 1 | Column 2 |
|---|---|---|---|---|---|
| 000 | 1 | 0 | 100 | 0.7940 | 0.6039 − j0.0689 |
|  | 0 | 1 |  | 0.6039 + j0.0689 | −0.7940 |
| 001 | 0.7940 | −0.5801 − j0.1818 | 101 | 0.3289 | 0.6614 − j0.6740 |
|  | −0.5801 + j0.1818 | −0.7940 |  | 0.6614 + j0.6740 | −0.3289 |
| 010 | 0.7940 | 0.0576 − j0.6051 | 110 | 0.5112 | 0.4754 + j0.7160 |
|  | 0.0576 + j0.6051 | −0.7940 |  | 0.4754 − j0.7160 | −0.5112 |
| 011 | 0.7940 | −0.2978 + j0.5298 | 111 | 0.3289 | −0.8779 + j0.3481 |
|  | −0.2978 + j0.5298 | −0.7940 |  | −0.8779 − j0.3481 | −0.3289 |

The above-mentioned phase-shift diversity scheme can acquire a frequency-selective diversity gain in an open loop, and can acquire a frequency scheduling gain in a closed loop. Due to these advantages of the phase-shift diversity scheme, many developers are conducting intensive research into the phase-shift diversity scheme. However, the phase-shift diversity scheme has the spatial multiplexing rate of 1, so that it cannot acquire a high transfer rate. And, if a resource allocation is fixed, the phase-shift diversity scheme has difficulty in acquiring the frequency-selective diversity gain and the frequency scheduling gain.

The coodbook-based precoding scheme can use a high spatial multiplexing rate simultaneously while requiring a small amount of feedback information (i.e., index information), so that it can effectively transmit data. However, since it must guarantee a stable channel for the feedback information, it is inappropriate for a mobile environment having an abruptly-changed channel and can be available for only a closed-loop system.

DISCLOSURE

Technical Problem

Accordingly, the present invention is directed to a phase-shift-based precoding method and a transceiver for supporting the same that substantially obviate one or more problems due to limitations and disadvantages of the related art.

An object of the present invention is to provide a phase-shift-based precoding method for solving the problems of the phase shift diversity scheme and the precoding scheme, and a method for applying the phase-shift-based precoding scheme in various ways by generalizing or extending a phase-shift-based precoding matrix.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, A method for transmitting and receiving data in a Multi-Input Multi-Output (MIMO) system using a plurality of sub-carriers, the method comprising: determining a precoding matrix, as a part of a phase-shift-based precoding matrix; determining a first diagonal matrix for a phase shift, as a part of the phase-shift-based precoding matrix; determining a unitary matrix, as a part of the phase-shift-based precoding matrix; and multiplying the precoding matrix, the first diagonal matrix, and the unitary matrix, and performing a precoding for a corresponding sub-carrier or virtual resource using the multiplied result.

In another aspect of the present invention, there is provided a transceiver for transmitting and receiving data in a Multi-Input Multi-Output (MIMO) system using a plurality of sub-carriers, the transceiver comprising: a precoding-matrix decision module which determines a precoding matrix as a part of a phase-shift-based precoding matrix, determines a first diagonal matrix for a phase shift as a part of the phase-shift-based precoding matrix, determines a unitary matrix as a part of a phase-shift-based precoding matrix, and then multiplies the precoding matrix, the first diagonal matrix, and the unitary matrix to determine a phase-shift-based precoding matrix; and a precoding module for performing a precoding by multiplying the determined phase-shift-based precoding matrix by a symbol of a corresponding sub-carrier.

In each aspect of the present invention, the precoding matrix may be selected by cyclically repeating a plurality of matrixes in a first codebook in a predetermined period based on an index k of a corresponding sub-carrier or resource. In this case, the precoding matrix may be selected by performing a codebook size of modulo operation on an index of a corresponding sub-carrier or resource. Further, the precoding matrix may be selected only from one or more precoding matrixes included in the first codebook, wherein the one or more precoding matrixes include at least one of '1', '−1', 'j', '−j' as an element, or the precoding matrix may be selected from a second codebook, wherein the second codebook is constituted only with one or more precoding matrixes including at least one of 1, −1, j, −j as an element, the one or more precoding matrixes being included in the first codebook.

In another aspect of the present invention, there is provided a method for transmitting and receiving data in a Multi-Input Multi-Output (MIMO) system using a plurality of sub-carriers. The method comprises determining a precoding matrix, and decoding a symbol of a corresponding sub-carrier or virtual resource based on the precoding matrix, wherein, the precoding matrix is selected by cyclically repeating a plurality of precoding matrixes in a first codebook in a predetermined period based on an index k of a corresponding sub-carrier or virtual resource.

It is to be understood that both the foregoing general description and the following detailed description of the present invention are exemplary and explanatory and are intended to provide further explanation of the invention as claimed.

Advantageous Effects

The present invention provides a phase-shift-based precoding technique for solving the problems of conventional CDD, PSD, and precoding methods, resulting in the implementation of effective communication. Specifically, the phase-shift-based precoding technique is generalized or extended, the design of a transceiver is simplified or the communication efficiency increases.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

Embodiment 1

Phase-Shift-Based Precoding Matrix

Figure 5:
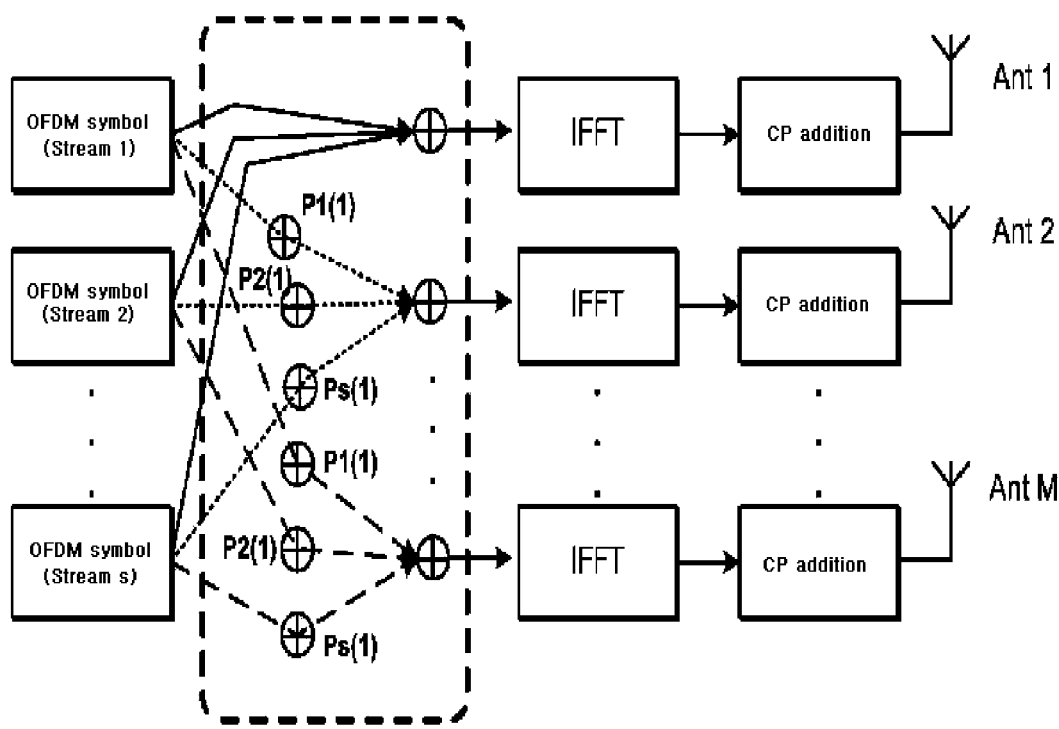
FIG. 5 is a block diagram illustrating the principal components of a transceiver for performing a phase-shift-based precoding scheme according to the present invention.

FIG. 5 is a block diagram illustrating the principal components of a transceiver for performing a phase-shift-based precoding scheme according to the present invention.

The phase-shift-based precoding scheme multiplies sequences having different phases by all streams, and transmits the multiplied streams via all antennas. Generally, from the viewpoint of a receiver, if a phase sequence is generated with a low cyclic delay value, a channel may have a frequency selectivity, and the size of the channel becomes larger or smaller according to parts of a frequency domain.

As can be seen from FIG. 5, a transmitter allocates a user equipment (UE) to a specific part of a frequency band fluctuating with a relatively-low cyclic delay value, so that it acquires a scheduling gain from the specific part in which a frequency increases to implement a stable channel status. In this case, in order to apply a cyclic delay value regularly increasing or decreasing to individual antennas, the transmitter uses the phase-shift-based precoding matrix.

The phase-shift-based precoding matrix (P) can be represented by the following Equation 1:

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix} \quad \text{[Equation 1]}$$

where k is a sub-carrier index or an index of a specific resource unit, $w_{i,j}^k$ (i=1, ..., $N_t$, j=1, ..., R) is a complex weight decided by "k", $N_t$ is the number of Tx antennas, and R is a spatial multiplexing rate.

In this case, the complex weight may have different values according to either an OFDM symbol multiplied by antennas or a corresponding sub-carrier index. The complex weight may be determined by at least one of a channel status and the presence or absence of feedback information.

In the meantime, it is preferable that the precoding matrix (P) of Equation 1 be configured in the form of a unitary matrix to reduce a loss of channel capacity in a open-loop MIMO system. In this case, in order to recognize a constituent condition of the unitary matrix, a channel capacity of a MIMO open-loop system can be represented by Equation 2:

$$Cu(H) = \log_2(det(I_{NT} + (SNR/N)HH^H)) \quad \text{[Equation 2]}$$

where H is a ($N_r \times N_t$)-sized MIMO channel matrix, and $N_r$ is the number of Rx antennas. If the phase-shift-based precoding matrix P is applied to Equation 2, the following Equation 3 is made:

$$C_{precoding} = \log_2(det(I_{NT} + (SNR/N)HPP^H H^H)) \quad \text{[Equation 3]}$$

As can be seen from Equation 3, in order to prevent the channel capacity from being damaged, $PP^H$ must be an identity matrix, so that the phase-shift-based precoding matrix P must satisfy the following Equation 4:

$$PP^H = I_N \quad \text{[Equation 4]}$$

In order to configure the phase-shift-based precoding matrix P in the form of a unitary matrix, the following two constraints must be simultaneously satisfied, i.e., a power constraint and an orthogonal constraint. The power constraint allows the size of each column of a matrix to be "1", and can be represented by the following Equation 5:

$$|w_{1,1}^k|^2+|w_{2,1}^k|^2+\ldots+|w_{N_t,1}^k|^2=1,$$

$$|w_{1,2}^k|^2+|w_{2,2}^k|^2+\ldots+|w_{N_t,2}^k|^2=1,$$

$$\ldots$$

$$|w_{1,R}^k|^2+|w_{2,R}^k|^2+\ldots+|w_{N_t,R}^k|^2=1, \quad \text{[Equation 5]}$$

The orthogonal constraint allows individual columns to have orthogonality therebetween, and can be represented by the following Equation 6:

$$w_{1,1}^{k*}w_{1,2}^k+w_{2,1}^{k*}w_{2,2}^k+\ldots+w_{N_t,1}^{k*}w_{N_t,2}^k=0,$$

$$w_{1,1}^{k*}w_{1,3}^k+w_{2,1}^{k*}w_{2,3}^k+\ldots+w_{N_t,1}^{k*}w_{N_t,3}^k=0,$$

$$\ldots$$

$$w_{1,1}^{k*}w_{1,R}^k+w_{2,1}^{k*}w_{2,R}^k+\ldots+w_{N_t,1}^{k*}w_{N_t,R}^k=0, \quad \text{[Equation 6]}$$

Next, a generalized equation of (2×2)-sized phase-shift-based precoding matrix and an equation for satisfying the above-mentioned two constraints will hereinafter be described in detail.

The following Equation 7 shows a phase-shift-based precoding matrix which has a spatial multiplexing rate of 2 under 2 Tx antennas:

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix} \quad \text{[Equation 7]}$$

where $\alpha_i$ and $\beta_i$ (i=1, 2) have a real number, $\theta_i$ (i=1, 2, 3, 4) is a phase value, and k is a sub-carrier index of an OFDM signal or a resource unit index. In order to configure the above-mentioned precoding matrix in the form of a unitary matrix, the power constraint of the following Equation 8 and the orthogonal constraint of the following Equation 9 must be satisfied:

$$|\alpha_1 e^{jk\theta_1}|^2+|\beta_2 e^{jk\theta_3}|^2=1, \ |\alpha_2 e^{jk\theta_1}|^2+|\beta_1 e^{jk\theta_2}|^2=1, \quad \text{[Equation 8]}$$

$$(\alpha_1 e^{jk\theta_1})^* \beta_1 e^{jk\theta_2}+(\beta_2 e^{jk\theta_3})^* \alpha_2 e^{jk\theta_1}=0, \quad \text{[Equation 9]}$$

where "*" is a conjugate complex number.

An example of the (2×2)-sized phase-shift-based precoding matrix satisfying Equations 8 and 9 is represented by the following Equation 10:

$$P_{2\times 2}^k = \frac{1}{\sqrt{2}} \begin{pmatrix} 1 & e^{jk\theta_2} \\ e^{jk\theta_3} & 1 \end{pmatrix} \quad \text{[Equation 10]}$$

where the relationship between $\theta_2$ and $\theta_3$ is represented by the following Equation 11:

$$k\theta_3 = -k\theta_2 + \pi \quad \text{[Equation 11]}$$

A precoding matrix may be configured in the form of a codebook, so that the codebook-formatted precoding matrix may be stored in a memory of a transmission- or reception-end. The codebook may include a variety of precoding matrixes created by different finite $\theta_2$ values.

In this case, "$\theta_2$" may be properly established by a channel status and the presence or absence of feedback information. If the feedback information is used, "$\theta_2$" is set to a low value. If the feedback information is not in use, "$\theta_2$" is set to a high value. As a result, a high frequency diversity gain is acquired.

In the meantime, a frequency diversity gain or frequency scheduling gain may be acquired according to the size of a delay sample applied to the phase-shift-based precoding.

Figure 6:
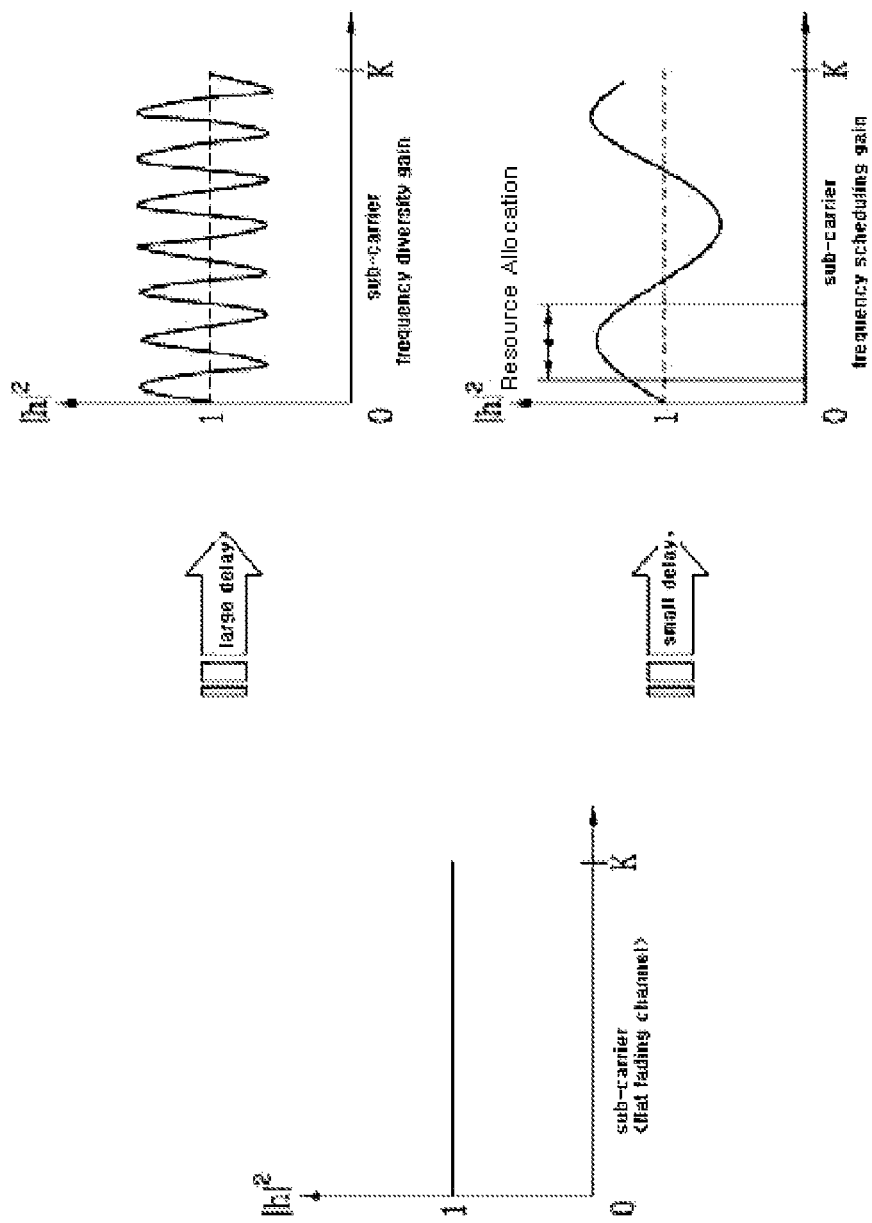
FIG. 6 graphically shows two applications of the phase-shift-based precoding or a phase shift diversity according to the present invention.

FIG. 6 graphically shows two applications of the phase-shift-based precoding or a phase shift diversity according to the present invention.

As can be seen from FIG. 6, if a delay sample (or a cyclic delay) of a high value is used, a frequency-selective period becomes shorter, so that a frequency selectivity increases and a channel code may acquire a frequency diversity gain. So, it is preferable that the high-value delay sample be used for an open-loop system in which the reliability of feedback information deteriorates due to an abrupt channel variation in time.

If a delay sample of a low value is used, a first part in which the channel size becomes larger and a second part in which the channel size becomes smaller occur in a changed frequency-selective channel of a flat-fading channel. Therefore, the channel size becomes larger in a predetermined sub-carrier area of the OFDM signal, and becomes smaller in the other sub-carrier area.

In this case, if an Orthogonal Frequency Division Multiple Access (OFDMA) system accommodating several users transmits an objective signal via a larger-channel-sized frequency band for each user, a Signal-to-Noise Ratio (SNR) can increase. And, the individual users may have different larger-channel-sized frequency bands very often, so that the system can acquire a multi-user diversity scheduling gain. From the viewpoint of a reception end, it must transmit only Channel Quality Indicator (CQI) information of a sub-carrier area using feedback information, so that an amount of the feedback information is relatively reduced.

A delay sample (or cyclic delay) for the phase-shift-based precoding may be predetermined in a transceiver, or may be fed back from a receiver to a transmitter.

Also, the spatial multiplexing rate R may also be predetermined in the transceiver. However, a receiver periodically recognizes a channel status, calculates the spatial multiplexing rate, and feeds back the calculated spatial multiplexing rate to a transmitter. Otherwise, the transmitter may calculate or change the spatial multiplexing rate using channel information fed back from the receiver.

Embodiment 2

Generalized Phase Shift Diversity Matrix

In the case of using a system in which the number of antennas is $N_t$ ($N_t$ is a natural number higher than 2) and a spatial multiplexing rate is R, the above-mentioned phase-shift-based precoding matrix can be represented by the following Equation 12:

$$GPSD_{N_t \times R}^k = \begin{pmatrix} w_{1,1}^k & w_{1,2}^k & \ldots & w_{1,R}^k \\ w_{2,1}^k & w_{2,2}^k & \ldots & w_{2,R}^k \\ \vdots & \vdots & \ddots & \vdots \\ w_{N_t,1}^k & w_{N_t,2}^k & \ldots & w_{N_t,R}^k \end{pmatrix} \quad \text{[Equation 12]}$$

$$= \begin{pmatrix} e^{j\theta_1 k} & 0 & \ldots & 0 \\ 0 & e^{j\theta_2 k} & \ldots & 0 \\ \vdots & \vdots & \ddots & 0 \\ 0 & 0 & 0 & e^{j\theta_{N_t} k} \end{pmatrix} (U_{N_t \times R}^k)$$

Equation 12 may be considered to be a generalized format of the conventional phase shift diversity scheme, so that the MIMO scheme shown in FIG. 12 will hereinafter be referred to as a Generalized Phase Shift Diversity (GPSD) scheme.

In Equation 12, $GPSD_{N_t \times R}^{k}$ is a GPSD matrix of a k-th sub-carrier or a k-th resource of a MIMO-OFDM signal which has $N_t$ Tx antennas and a spatial multiplexing rate of R. $U_{N_t \times R}$ is a unitary matrix (i.e., a second matrix) satisfying $U_{N_t \times R}^{H} \times U_{N_t \times R} = I_{R \times R}$, and is adapted to minimize an interference between sub-carrier symbols corresponding to individual antennas. Specifically, in order to maintain a diagonal matrix (i.e., a first matrix) for a phase shift without any change, it is preferable that $U_{N_t \times R}$ may satisfy the condition of the unitary matrix. In Equation 12, a phase angle $\theta_i$ (i=1, ... , $N_t$) of a frequency domain and a delay time $\tau_i$ (i=1, ... , $N_t$) of a time domain have a predetermined relationship, which is represented by the following Equation 13:

$$\theta_i = -2\pi/N_{\mathit{fft}} \cdot \tau_i \quad \text{[Equation 13]}$$

where $N_{\mathit{fft}}$ is the number of sub-carriers of an OFDM signal.

A modified example of Equation 12 is shown in the following Equation 14, so that the GPSD matrix can be calculated by Equation 14:

$$GPSD_{N_t \times R}^{k} = \begin{pmatrix} w_{1,1}^{k} & w_{1,2}^{k} & \cdots & w_{1,R}^{k} \\ w_{2,1}^{k} & w_{2,2}^{k} & \cdots & w_{2,R}^{k} \\ \vdots & \vdots & \ddots & \vdots \\ w_{N_t,1}^{k} & w_{N_t,2}^{k} & \cdots & w_{N_t,R}^{k} \end{pmatrix} \quad \text{[Equation 14]}$$

$$= (U_{N_t \times R}^{k}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix}$$

If the GPSD matrix is made by Equation 14, symbols of each data stream (or OFDM sub-carrier) are shifted by the same phase, so that the GPSD matrix can be easily configured. In other words, the GPSD matrix of Equation 14 has columns having the same phase whereas the GPSD matrix of Equation 12 has rows having the same phase, so that the individual sub-carrier symbols are shifted by the same phase. If Equation 14 is extended, the GPSD matrix can be calculated by the following Equation 15:

$$GPSD_{N_t \times R}^{k} = \quad \text{[Equation 15]}$$

$$\begin{pmatrix} w_{1,1}^{k} & w_{1,2}^{k} & \cdots & w_{1,R}^{k} \\ w_{2,1}^{k} & w_{2,2}^{k} & \cdots & w_{2,R}^{k} \\ \vdots & \vdots & \ddots & \vdots \\ w_{N_t,1}^{k} & w_{N_t,2}^{k} & \cdots & w_{N_t,R}^{k} \end{pmatrix} = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix}$$

$$(U_{N_t \times R}^{k}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix}$$

As can be seen from Equation 15, rows and columns of the GPSD matrix have independent phases, so that a variety of frequency diversity gains can be acquired.

As an example of Equation 12, 14 or 15, a GPSD matrix equation of a system which uses two Tx antennas and a 1-bit codebook can be represented by the following Equation 16:

$$GPSD_{2 \times 2}^{k} = \begin{pmatrix} \alpha & \beta \\ \beta & -\alpha \end{pmatrix}, \quad \alpha^2 + \beta^2 = 1 \quad \text{[Equation 16]}$$

In Equation 16, if "α" is decided, "β" is easily decided. So, the value of "α" may be fixed to two proper values, and information associated with the value of "α" may be fed back to a codebook index as necessary. For example, two conditions may be prescribed between a transmitter and a receiver, i.e., one condition in which "α" is set to "0.2" if a feedback index is "0", and the other condition in which "α" is set to "0.8" if a feedback index is "1".

A predetermined precoding matrix for acquiring a SNR gain may be used as an example of the unitary matrix $U_{N_t \times R}$ in Equation 12, 14, or 15. A Walsh Hadamard matrix or a DFT matrix may be used as the above-mentioned precoding matrix. If the Walsh Hadamard matrix is used, an example of the GPSD matrix of Equation 12 can be represented by the following Equation 17:

$$GPSD_{4 \times 4}^{k} = \quad \text{[Equation 17]}$$

$$\frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Equation 17 is made on the assumption that a system has 4 Tx antennas and a spatial multiplexing rate of 4. In this case, the second matrix is properly reconstructed, so that a specific Tx antenna is selected (i.e., antenna selection) or the spatial multiplexing rate may be adapted (i.e., rate adaptation).

In the meantime, the unitary matrix $U_{N_t \times R}$ of Equation 12, 14 or 15 may be configured in the form of a codebook, so that the codebook-formatted unitary matrix is stored in a transmission or reception end. In this case, the transmission end receives codebook index information from the reception end, selects a second matrix of a corresponding index from its own codebook, and configures a phase-shift-based precoding matrix using Equations 12, 14, or 15.

If a (2×2)- or (4×4)-sized Walsh code is used as the unitary matrix $U_{N_t \times R}$ of Equation 12, 14, or 15, an example of the GPSD matrix is acquired, as represented by the following Tables 2 and 3:

TABLE 2

| 2 Tx | |
|---|---|
| Rate 1 | Rate 2 |
| $\frac{1}{\sqrt{2}}\begin{bmatrix} 1 \\ e^{j\theta_1 k} \end{bmatrix}$ | $\frac{1}{\sqrt{2}}\begin{bmatrix} 1 & 1 \\ e^{j\theta_1 k} & -e^{j\theta_1 k} \end{bmatrix}$ |

TABLE 3

| | 4 Tx | |
|---|---|---|
| Rate 1 | Rate 2 | Rate 4 |
| $\frac{1}{2}\begin{bmatrix} 1 \\ e^{j\theta_1 k} \\ e^{j\theta_2 k} \\ e^{j\theta_3 k} \end{bmatrix}$ | $\frac{1}{2}\begin{bmatrix} 1 & 1 \\ e^{j\theta_1 k} & -e^{j\theta_1 k} \\ e^{j\theta_2 k} & e^{j\theta_2 k} \\ e^{j\theta_3 k} & -e^{j\theta_3 k} \end{bmatrix}$ | $\frac{1}{2}\begin{bmatrix} 1 & 1 & 1 & 1 \\ e^{j\theta_1 k} & -e^{j\theta_1 k} & e^{j\theta_1 k} & -e^{j\theta_1 k} \\ e^{j\theta_2 k} & e^{j\theta_2 k} & -e^{j\theta_2 k} & -e^{j\theta_2 k} \\ e^{j\theta_3 k} & -e^{j\theta_3 k} & -e^{j\theta_3 k} & e^{j\theta_3 k} \end{bmatrix}$ |

Embodiment 3

Time-Variant Generalized Phase Shift Diversity

In the GPSD matrix of Equation 12, 14, or 15, a phase angle ($\theta_i$) of a diagonal matrix and/or a unitary matrix (U) may be changed in time. For example, a time-variant GPSD of Equation 12 can be represented by the following Equation 18:

$$GPSD^k_{N_t \times R}(t) = \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_{N_t}(t)k} \end{pmatrix} (U_{N_t \times R}(t)) \quad \text{[Equation 18]}$$

where $GPSD_{N_t \times R}^k(t)$ is a GPSD matrix of a k-th sub-carrier or a k-th resource unit of a MIMO-OFDM signal which has $N_t$ Tx antennas and a spatial multiplexing rate of R at a specific time (t). $U_{N_t \times R}(t)$ is a unitary matrix (i.e., a fourth matrix) satisfying $U_{N_t \times R}^H \times U_{N_t \times R} = I_{R \times R}$, and is adapted to minimize an interference between sub-carrier symbols corresponding to individual antennas.

Specifically, in order to maintain characteristics of the unitary matrix of a diagonal matrix (i.e., third matrix) for a phase shift without any change, it is preferable that $U_{N_t \times R}(t)$ may satisfy the condition of the unitary matrix. In Equation 18, a phase angle $\theta_i(t)$ (i=1, ..., $N_t$) and a delay time $\tau_i(t)$ (i=1, ..., $N_t$) have a predetermined relationship, which is represented by the following Equation 19:

$$\theta_i(t) = -2\pi/N_{fft} \cdot \tau(t) \quad \text{[Equation 19]}$$

where $N_{fft}$ is the number of sub-carriers of an OFDM signal.

As can be seen from Equations 18 and 19, a time delay sample value and a unitary matrix may be changed in time. In this case, a unit of the time may be set to an OFDM symbol or a predetermined-unit time.

If a unitary matrix for acquiring a time-variant GPSD is represented by a GPSD matrix based on the (2×2)-sized Walsh code, the following GPSD matrix can be made as shown in the following Table 4:

TABLE 4

| 2 Tx | |
|---|---|
| Rate 1 | Rate 2 |
| $\begin{bmatrix} 1 \\ e^{j\theta_1(t)k} \end{bmatrix}$ | $\begin{bmatrix} 1 & 1 \\ e^{j\theta_1(t)k} & -e^{j\theta_1(t)k} \end{bmatrix}$ |

If a unitary matrix for acquiring a time-variant GPSD is represented by a GPSD matrix based on the (4×4)-sized Walsh code, the following GPSD matrix can be made as shown in the following Table 5:

TABLE 5

| | 4 Tx | |
|---|---|---|
| Rate 1 | Rate 2 | Rate 4 |
| $\begin{bmatrix} 1 \\ e^{j\theta_1(t)k} \\ e^{j\theta_2(t)k} \\ e^{j\theta_3(t)k} \end{bmatrix}$ | $\begin{bmatrix} 1 & 1 \\ e^{j\theta_1(t)k} & -e^{j\theta_1(t)k} \\ e^{j\theta_2(t)k} & e^{j\theta_2(t)k} \\ e^{j\theta_3(t)k} & -e^{j\theta_3(t)k} \end{bmatrix}$ | $\begin{bmatrix} 1 & 1 & 1 & 1 \\ e^{j\theta_1(t)k} & -e^{j\theta_1(t)k} & e^{j\theta_1(t)k} & -e^{j\theta_1(t)k} \\ e^{j\theta_2(t)k} & e^{j\theta_2(t)k} & -e^{j\theta_2(t)k} & -e^{j\theta_2(t)k} \\ e^{j\theta_3(t)k} & -e^{j\theta_3(t)k} & -e^{j\theta_3(t)k} & e^{j\theta_3(t)k} \end{bmatrix}$ |

Although the above-mentioned third embodiment has disclosed the time-variant GPSD matrix associated with Equation 12, it should be noted that the time-variant GPSD matrix can also be applied to the diagonal matrix and unitary matrix of Equations 14 and 15. Therefore, although the following embodiments will be described with reference to Equation 12, it is obvious to those skilled in the art that the scope of the following embodiments are not limited to Equation 12 and can also be applied to Equations 14 and 15.

Embodiment 4

Extension of Generalized Phase Shift Diversity

If a third matrix corresponding to a precoding matrix is added to the GPSD matrix composed of both a diagonal matrix and a unitary matrix, an extended GPSD matrix can be made as shown in the following Equation 20:

$$GPSD^k_{N_t \times R} = (\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & 0 & e^{j\theta_R k} \end{pmatrix} (\mathbb{U}_{R \times R}) \quad \text{[Equation 20]}$$

Compared with Equation 12, the extended GPSD matrix of Equation 20 further includes a ($N_t \times R$)-sized precoding matrix (P) located before a diagonal matrix. Therefore, the size of the diagonal matrix is changed to a (R×R)-size.

The added precoding matrix $\mathbb{P}_{N_t \times R}$ differently assigned to a specific frequency band or a specific sub-carrier symbol. Preferably, in the case of an open-loop system, the added precoding matrix $\mathbb{P}_{N_t \times R}$ may be set to a fixed matrix. By the addition of the precoding matrix $\mathbb{P}_{N_t \times R}$, an optimum SNR gain can be acquired. Alternatively, a transmission end or reception end may have a codebook equipped with a plurality of precoding matrixes (P).

In the meantime, in the extended GPSD matrix, at least one of the precoding matrix (P), the phase angle ($\theta$) of the diagonal matrix, and the unitary matrix (U) may be changed in time. For this purpose, if an index of the next precoding matrix P is fed back in units of a predetermined time or a predetermined sub-carrier, a specific precoding matrix P corresponding to the index may be selected from a predetermined codebook.

The extended GPSD matrix according to the fourth embodiment can be represented by the following Equation 21:

$$GPSD_{N_t \times R}^k(t) = \quad \text{[Equation 21]}$$

$$(\mathbb{P}_{N_t \times R}(t)) \begin{pmatrix} e^{j\theta_1(t)k} & 0 & \cdots & 0 \\ 0 & e^{j\theta_2(t)k} & \cdots & 0 \\ \vdots & \vdots & \ddots & \vdots \\ 0 & 0 & 0 & e^{j\theta_R(t)k} \end{pmatrix} (\mathbb{U}_{R \times R}(t))$$

As an example of the extended GPSD matrix, a matrix equation of a MIMO system which includes two or four Tx antennas is shown in the following Equations 22 and 23:

$$GPSD_{2 \times 2}^k(t) = (\mathbb{P}_{2 \times 2}(t)) \begin{pmatrix} 1 & 0 \\ 0 & e^{j\theta(t)k} \end{pmatrix} (DFT_{2 \times 2}) \quad \text{[Equation 22]}$$

$$GPSD_{4 \times R}^k(t) = \quad \text{[Equation 23]}$$

$$(P_{4 \times R}(t)) \begin{pmatrix} 1 & 0 & \cdots & 0 \\ 0 & e^{j\theta(t)k} & \cdots & 0 \\ \vdots & \vdots & & \\ 0 & 0 & \cdots & e^{j(R-1)\theta(t)k} \end{pmatrix} (DFT_{R \times R})$$

In Equations 22 and 23, although a DFT matrix is used as a unitary matrix, the scope of the present invention is not limited to the DFT matrix, and can also be applied to other matrixes capable of satisfying a given unitary condition such as a Walsh Hadamard code.

As another example of the extended GPSD matrix, a matrix equation of a MIMO system which includes four Tx antennas is shown in the following Equation 24:

$$GPSD_{N_t \times R}^k(t) = \quad \text{[Equation 24]}$$

$$\underbrace{\begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_{N_t}(t)k} \end{pmatrix}}_{D_1}$$

$$(P_{N_t \times R}(t)) \underbrace{\begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_R(t)k} \end{pmatrix}}_{D_2} (U_{R \times R})$$

Compared with Equation 12, the extended GPSD matrix of Equation 24 further includes a ($N_t \times N_t$)-sized diagonal matrix (D1) and a ($N_t \times R$)-sized precoding matrix (P), which are located before a diagonal matrix (D2). Therefore, the size of the diagonal matrix (D2) is changed to a (R×R)-size.

The added precoding matrix $\mathbb{P}_{N_t \times R}$ may be differently assigned to a specific frequency band or a specific sub-carrier symbol. Preferably, in the case of an open-loop system, the added precoding matrix $\mathbb{P}_{N_t \times R}$ may be set to a fixed matrix. By the addition of the precoding matrix $\mathbb{P}_{N_t \times R}$, an optimum SNR gain can be acquired.

Preferably, a transmission end or reception end may have a codebook equipped with a plurality of precoding matrixes (P).

In this case, by the diagonal matrixes D1 and D2, a phase angle can be shifted in two ways in a single system. For example, if a low-value phase shift is used by the diagonal matrix D1, a multi-user diversity scheduling gain can be acquired. If a high-value phase shift is used by the diagonal matrix D2, a frequency diversity gain can be acquired. The diagonal matrix D1 is adapted to increase a system performance, and the other diagonal matrix D2 is adapted to average a channel between streams. And, a high-value phase shift is used by the diagonal matrix D1, so that a frequency diversity gain can increase. A high-value phase shift diversity is used by the diagonal matrix D2, a channel between streams can be averaged. This gain can be acquired from Equation 21. In this case, the matrix P of Equation 21 may be modified on the basis of a sub-carrier unit or resource unit without feedback information from a receiver, and be then used. This modified format can be represented by the following Equation 25:

$$GPSD_{N_t \times R}^k(t) = \quad \text{[Equation 25]}$$

$$(P_{N_t \times R}^k(t)) \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & \cdots & e^{j\theta_R(t)k} \end{pmatrix} (U_{R \times R})$$

In Equation 25, $P_{N_t \times R}^k(t)$ is indicative of a specific case, in which individual resource indexes (k) use different precoding matrixes, a frequency diversity gain increases, and a channel between streams is averaged by a diagonal matrix and an unitary matrix (U).

Embodiment 5

Codebook Subset Restriction Scheme

Hereinafter, a codebook subset restriction scheme refers to a scheme wherein only a specific portion of a codebook which includes a $N_c$ number of precoding matrixes are used according to a base station or a mobile terminal. For example, if the codebook subset restriction scheme is used, a $N_{restrict}$ number of precoding matrixes among the $N_c$ number of precoding matrixes is used. The codebook subset restriction scheme may be used to reduce complexity or to reduce interferences between multiple cells. In this case, $N_{restrict}$ should not be larger than $N_c$. For example, presuming that the $N_c$ is equal to 6, a $P_{N_t \times R}$ representing a codebook having a total of 6 precoding matrixes, and $P_{N_t \times R}^{restrict}$ representing a codebook having only 4 precoding matrixes of the total of 6 precoding matrixes, can be represented by the following Equation 26:

$$P_{N_t \times R} = \{P_{N_t \times R}^0, P_{N_t \times R}^1, P_{N_t \times R}^2, P_{N_t \times R}^3, P_{N_t \times R}^4, P_{N_t \times R}^5\},$$

$$P_{N_t \times R}^{restrict} = \{P_{N_t \times R}^0, P_{N_t \times R}^2, P_{N_t \times R}^3, P_{N_t \times R}^5\} =$$
$$W_{N_t \times R} = \{W_{N_t \times R}^0, W_{N_t \times R}^1, W_{N_t \times R}^2, W_{N_t \times R}^3\} \quad \text{[Equation 26]}$$

In Equation 26, the codebook $W_{N_t \times R}$ is the same as the codebook $P_{N_t \times R}^{restrict}$ except that indexes are rearranged. In case of using the codebook subset restriction scheme with Equation 26, precoding matrixes comprised of only the elements of $\{1, -1, j, -j\}$ may be used, and the size of elements may have different value according to normalization factor.

Embodiment 6

Cyclically Repeating Precoding Matrixes in a Codebook for Use

For example, if a set of precoding matrixes at a specific time is predefined and agreed between a transmitter and a receiver, this can be represented by Equation 27 as following:

$$P_{N_t \times R} = \{P^0_{N_t \times R}, P^1_{N_t \times R}, \ldots, P^{N_c-1}_{N_t \times R}\} \quad \text{[Equation 27]}$$

$$GPSD^k_{N_t \times R} = \left(P^{k \bmod N_c}_{N_t \times R}\right) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (U_{R \times R})$$

In Equation 27, the set of precoding matrixes includes a $N_c$ number of precoding matrixes. Equation 27 can be simplified to Equation 28 as following:

$$P_{N_t \times R} = \{P^0_{N_t \times R}, P^1_{N_t \times R}, \ldots, P^{N_c-1}_{N_t \times R}\} \quad \text{[Equation 28]}$$

$$GPSD^k_{N_t \times R} = \left(P^{k \bmod N_c}_{N_t \times R}\right) \prod^k_{R \times R}$$

Equation 27 and Equation 28 represent a method for cyclically repeating the precoding matrixes in the codebook $P_{N_t \times R}$ according to subcarriers or resource index. In addition, $\Pi^k_{R \times R}$ in Equation 28 has the role of scrambling data stream, and thus, $\Pi^k_{R \times R}$ can be referred to as data stream permutation matrix. $\Pi^k_{R \times R}$ can be selected according to spatial multiplexing rate (R) as shown in Equation 27. $\Pi^k_{R \times R}$ may be represented with a simple form as Equation 29 as following:

Spatial multiplexing rate: 2 [Equation 29]

$$\prod^k_{2 \times 2} = \begin{pmatrix} 0 & 1 \\ 1 & 0 \end{pmatrix}^k \text{ or } \begin{pmatrix} 1 & 0 \\ 0 & e^{j\theta_1 k} \end{pmatrix} DFT_{2 \times 2} \text{ or } \begin{pmatrix} 1 & 0 \\ 0 & 1 \end{pmatrix}^k$$

Spatial multiplexing rate: 3

$$\prod^k_{3 \times 3} = \begin{pmatrix} 0 & 1 & 0 \\ 0 & 0 & 1 \\ 1 & 0 & 0 \end{pmatrix}^k \text{ or}$$

$$\begin{pmatrix} 1 & 0 & 0 \\ 0 & e^{j\theta_1 k} & 0 \\ 0 & 0 & e^{j\theta_2 k} \end{pmatrix} DFT_{3 \times 3} \text{ or } \begin{pmatrix} 1 & 0 & 0 \\ 0 & 1 & 0 \\ 0 & 0 & 1 \end{pmatrix}^k$$

Spatial multiplexing rate: 4

$$\prod^k_{4 \times 4} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^k \text{ or}$$

$$\begin{pmatrix} 1 & 0 & 0 & 0 \\ 0 & e^{j\theta_1 k} & 0 & 0 \\ 0 & 0 & e^{j\theta_2 k} & 0 \\ 0 & 0 & 0 & e^{j\theta_3 k} \end{pmatrix} DFT_{4 \times 4} \text{ or } \begin{pmatrix} 1 & 0 & 0 & 0 \\ 0 & 1 & 0 & 0 \\ 0 & 0 & 1 & 0 \\ 0 & 0 & 0 & 1 \end{pmatrix}^k$$

As shown in Equation 29, the $\Pi^k_{R \times R}$ can include identity matrix, therefore, it is possible to skip the operation of scrambling data stream.

The method of cyclically repeating the precoding matrixes in the codebook as above explained can also be used in a codebook in which the codebook subset restriction scheme is applied. For example, applying $W_{N_t \times R}$ in Equation 26 to Equation 28, Equation 28 can be represented as Equation 30 as following:

$$P^{restrict}_{N_t \times R} = \{P^0_{N_t \times R}, P^2_{N_t \times R}, P^3_{N_t \times R}, P^5_{N_t \times R}\} \quad \text{[Equation 30]}$$

$$= W_{N_t \times R}$$

$$= \{W^0_{N_t \times R}, W^1_{N_t \times R}, W^2_{N_t \times R}, W^3_{N_t \times R}\}$$

$$GPSD^k_{N_t \times R} = \left(W^{k \bmod N_{restrict}}_{N_t \times R}\right) \prod^k_{R \times R}$$

where "k" is a sub-carrier index or a resource index. In Equation 30, $N_{restrict}$ is equal to 4. That is, Equation 30 represents a method of cyclically repeating the precoding matrixes in a precoding-matrix-restricted codebook $W_{N_t \times R}$ according to subcarriers or resource index, Embodiment 6-1

Cyclically Repeating Precoding Matrixes in a Codebook in a Predetermined Unit

Equation 28 can be represented as Equation 31 according to specific frequency resource configuration.

$$P_{N_t \times R} = \{P^0_{N_t \times R}, P^2_{N_t \times R}, \ldots, P^{N_c-1}_{N_t \times R}\} \quad \text{[Equation 31]}$$

$$GPSD^k_{N_t \times R} = \left(P^{\left\lceil \frac{k}{v} \right\rceil \bmod N_c}_{N_t \times R}\right) \prod^k_{R \times R} \text{ or}$$

$$GPSD^k_{N_t \times R} = \left(P^{\left\lfloor \frac{k}{v} \right\rfloor \bmod N_c}_{N_t \times R}\right) \prod^k_{R \times R}$$

In Equation 31, "k" may be a sub-carrier index or a virtual-resource index. According to Equation 31, if "k" is the sub-carrier index, different precoding matrixes are assigned every v subcarriers. Else if "k" is the virtual-resource index, different precoding matrixes are assigned every v virtual resources.

Equation 31 shows a specific case in which a precoding matrix is configured to be able to get changed in $N_c$ precoding matrixes. And, the value of v may be decided by a spatial multiplexing rate of the precoding matrix. For example, the value of v may be denoted by v=R.

Also, in the case of using the codebook subset restriction scheme which was explained with Equations 26, the precoding matrix may also be changed on the basis of a predetermined number of sub-carrier units or a predetermined number of resource units. This modified format can be represented by the following Equation 32:

$$P^{restrict}_{N_t \times R} = \{P^0_{N_t \times R}, P^2_{N_t \times R}, P^3_{N_t \times R}, P^5_{N_t \times R}\} = \quad \text{[Equation 32]}$$

$$W_{N_t \times R} = \{W^0_{N_t \times R}, W^1_{N_t \times R}, W^2_{N_t \times R}, W^3_{N_t \times R}\}$$

$$GPSD^k_{N_t \times R} = \left(W^{\left\lceil \frac{k}{v} \right\rceil \bmod N_{restrict}}_{N_t \times R}\right) \prod^k_{R \times R} \text{ or}$$

$$GPSD^k_{N_t \times R} = \left(W^{\left\lfloor \frac{k}{v} \right\rfloor \bmod N_{restrict}}_{N_t \times R}\right) \prod^k_{R \times R}$$

Like the case of Equation 31, the precoding matrix of Equation 32 may also be changed according to the value of v on the basis of v units. Differently from Equation 31, the precoding matrix of Equation 32 is changed in $N_{restrict}$ ($\leq N_c$) number of precoding matrixes.

In the meantime, in case that a frequency diversity scheme is applied such that precoding matrixes are cyclically repeated per specific resource on the basis of the codebook subset restriction scheme explained in the embodiment 5, frequency diversity gain may be changed according to the number of cyclically repeated precoding matrix. Various modified embodiments of the codebook subset restriction scheme will be explained hereinafter.

Embodiment 5-1

Codebook Subset Restriction Scheme According to Spatial Multiplexing Rate

Subsets may be differently defined according to spatial multiplexing rate. For example, in a case of low spatial multiplexing rate, the number of subset can be increased to obtain more frequency diversity gain, in other case of high spatial multiplexing rate, the number of subset can be decreased to reduce complexity while maintaining the performance.

Equation 33 represents an exemplary method of defining codebook subsets with different size according to each spatial multiplexing rate.

$$W_{N_t \times 2} = \{W^0_{N_t \times 2}, W^1_{N_t \times 2}, W^2_{N_t \times 2}, W^3_{N_t \times 2}\}, N^2_{restrict} = 4 \quad \text{[Equation 33]}$$

$$W_{N_t \times 3} = \{W^0_{N_t \times 3}, W^1_{N_t \times 3}, W^2_{N_t \times 3}\}, N^3_{restrict} = 3$$

$$W_{N_t \times 4} = \{W^0_{N_t \times 4}\}, N^4_{restrict} = 1$$

$$GPSD^k_{N_t \times R} = \left(W^{\lfloor \frac{k}{v} \rfloor modN^R_{restrict}}_{N_t \times R}\right)\prod_{R \times R}^k \quad \text{or}$$

$$GPSD^k_{N_t \times R} = \left(W^{\lfloor \frac{k}{v} \rfloor modN^R_{restrict}}_{N_t \times R}\right)\prod_{R \times R}^k$$

$N_{restrict}^R$ restrict in Equation 33 represent the number of precoding matrixes of a codebook subset according to a spatial multiplexing rate R. Using the method of Equation 33, in case of cyclically repeating precoding matrixes for a codebook, for which the codebook subset restriction scheme of embodiment 5 is applied, the complexity of a receiver can be reduces and performance can be enhanced.

Embodiment 5-2

Codebook Subset Restriction Scheme According to Channel Coding Rate

Subsets may be differently defined according to channel coding rate. For example, in a case of a low channel coding rate, frequency diversity gain may generally increase, in other case of a high channel coding rate, frequency diversity gain may generally decrease. Therefore, in an environment with the same spatial multiplexing rate, codebook subsets with different sizes may be adapted according to channel coding rate such that performance is optimized.

Embodiment 5-3

Codebook Subset Restriction Scheme According to Retransmission

Subsets may be differently defined considering retransmission. For example, the possibility of retransmission success at a receiver can be increased by using a subset other than the codebook subset, which was used at the time of initial transmission, at the time of retransmission. Therefore, according to whether to retransmit or not or according to the number of retransmission, system performance can be increased by cyclically repeating precoding matrix by using different subsets having the same number of precoding matrixes.

Embodiment 7

Extension of Generalized Phase Shift Diversity Using a Power Control Per Transmission Antenna Performance can be increased or power can be effectively used by using different power levels according to frequency or time per transmission antenna for precoding schemes.

For example, power can be controlled per antenna by using Equation 28, Equation 30, Equation 31, and Equation 32. Particularly, the exemplary application for Equation 31 and Equation 32 can be represented as Equation 34 and Equation 35 as following:

$$P_{N_t \times R} = \{P^0_{N_t \times R}, P^1_{N_t \times R}, \ldots, P^{N_c-1}_{N_t \times R}\}, \quad \text{[Equation 34]}$$

$$GPSD^k_{N_t \times R} = D^m_{N_t \times N_t}(t)\left(P^{\lfloor \frac{k}{v} \rfloor modN_c}_{N_t \times R}\right)\prod_{R \times R}^k \quad \text{or}$$

$$GPSD^k_{N_t \times R} = D^m_{N_t \times N_t}(t)\left(P^{\lfloor \frac{k}{v} \rfloor modN_c}_{N_t \times R}\right)\prod_{R \times R}^k$$

$$D^m_{N_t \times N_t}(t) = \begin{pmatrix} a^m_1(t) & 0 & \ldots & 0 \\ 0 & a^m_2(t) & \ldots & 0 \\ \vdots & \vdots & \ddots & 0 \\ 0 & 0 & \ldots & a^m_{N_t}(t) \end{pmatrix}$$

The role of $\Pi_{R \times R}^k$ in Equation 34 is to permute data stream as explained above. $\Pi_{R \times R}^k$ can be represented in the same form of Equation 29. Further, $D_{N_t \times N_t}^m(t)$ represents a diagonal matrix which enables different power levels to transmit per transmission antenna according to m-th resource area or time t. In addition, $a_i^m(t)$ represents a power control factor used at time t of m-th resource area of i-th transmission antenna.

Equation 34 represents a scheme in which a scheme of power control per transmission antenna is applied, by using a codebook having a $N_c$ number of precoding matrixes, to the scheme of cyclically repeating. The following Equation 35 represents a method in which a scheme of power control per transmission antenna is applied, by using the codebook subset restriction scheme, to the scheme of cyclically repeating at Equation 32.

$$P^{restrict}_{N_t \times R} = \{P^0_{N_t \times R}, P^2_{N_t \times R}, P^3_{N_t \times R}, P^5_{N_t \times R}\} = \quad \text{[Equation 35]}$$

$$W_{N_t \times R} = \{W^0_{N_t \times R}, W^1_{N_t \times R}, W^2_{N_t \times R}, W^3_{N_t \times R}\}$$

$$GPSD^k_{N_t \times R} = D^m_{N_t \times N_t}(t)\left(W^{\lfloor \frac{k}{v} \rfloor modN_{restrict}}_{N_t \times R}\right)\prod_{R \times R}^k \quad \text{or}$$

$$GPSD^k_{N_t \times R} = D^m_{N_t \times N_t}(t)\left(W^{\lfloor \frac{k}{v} \rfloor modN_{restrict}}_{N_t \times R}\right)\prod_{R \times R}^k,$$

-continued $$D_{N_t \times N_t}^m(t) = \begin{pmatrix} a_1^m(t) & 0 & \cdots & 0 \\ 0 & a_2^m(t) & \cdots & 0 \\ \vdots & \vdots & \ddots & 0 \\ 0 & 0 & \cdots & a_{N_t}^m(t) \end{pmatrix}$$

Each of $\Pi_{R \times R}^k$, $D_{N_t \times N_t}^m(t)$ and $a_i^m(t)$ in Equation 35 represents the same as in Equation 34. However, Equation 35 is different from equation 34 in that a precoding matrix is cyclically repeated in a $N_{restrict} (\leq N_c)$ number of precoding matrixes.

Embodiment 8

Transceiver for Performing Phase-Shift-Based Precoding

Generally, a communication system includes a transmitter and a receiver. In this case, the transmitter and the receiver may be considered to be a transceiver. In order to clarify a feedback function, a part for transmitting general data is the transmitter, and the other part for transmitting feedback data to the transmitter is the receiver.

In a downlink, the transmitter may be a part of a Node-B, or the receiver may be a part of a user equipment (UE). In an uplink, the transceiver may be a part of the UE, or the receiver may be a part of the Node-B. The Node-B may include a plurality of receivers and a plurality of transmitters. And, the user equipment (UE) may also include a plurality of receivers and a plurality of transmitters. Generally, individual components of the receiver have functions opposite to those of the transmitter, so that only the transceiver will hereinafter be described for the convenience of description and better understanding of the present invention.

Figure 7:
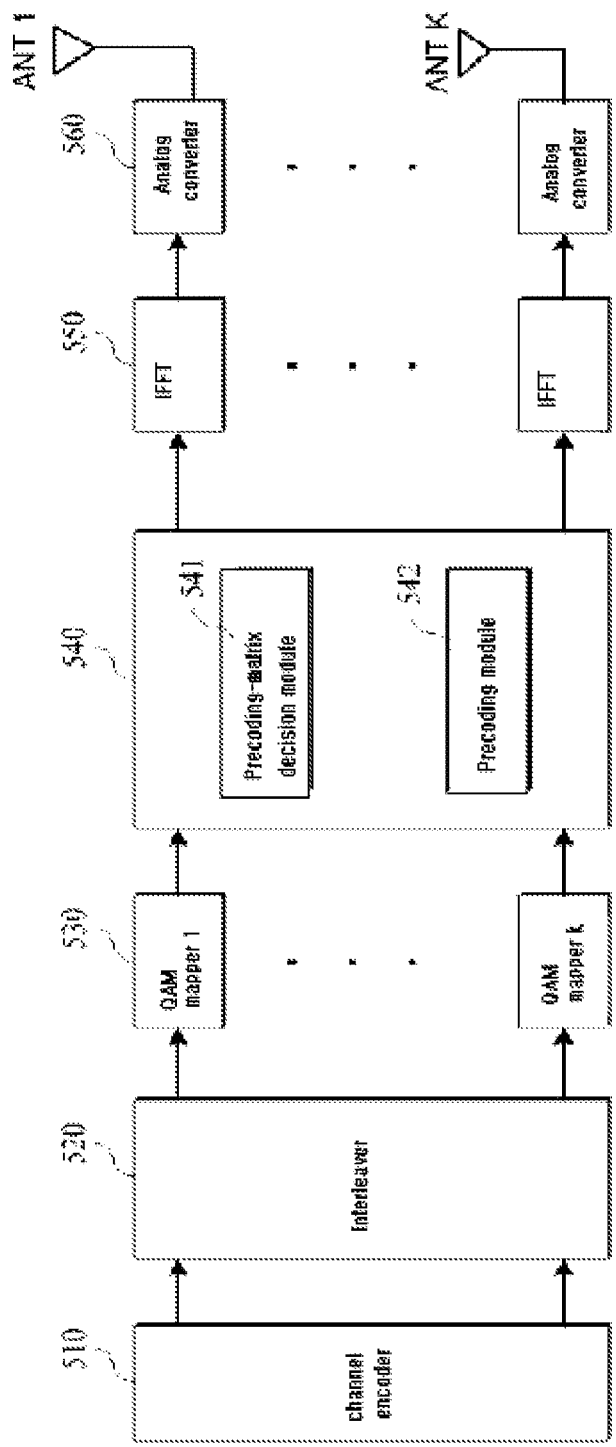
FIG. 7 is a block diagram illustrating a SCW OFDM transmitter based on a phase-shift-based precoding scheme according to the present invention.
Figure 8:
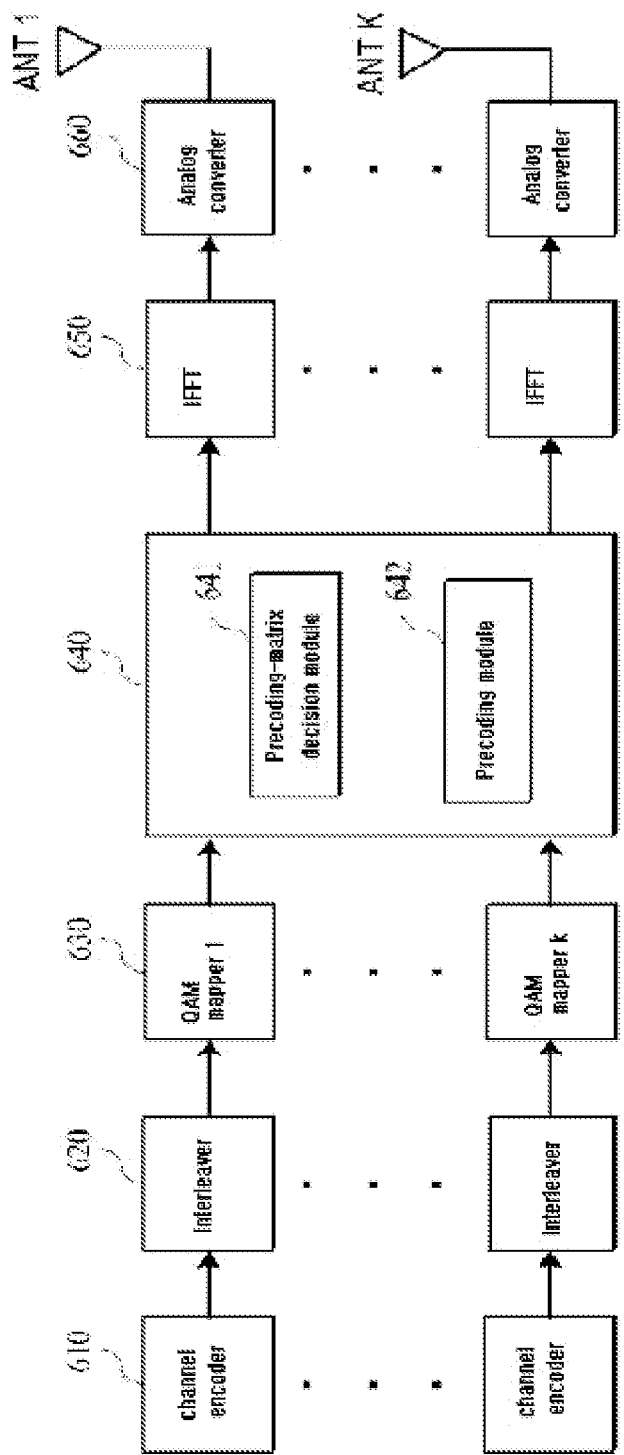
FIG. 8 is a block diagram illustrating a MCW OFDM transmitter according to the present invention.

FIG. 7 is a block diagram illustrating a SCW OFDM transmitter based on a phase-shift-based precoding scheme according to the present invention. FIG. 8 is a block diagram illustrating a MCW OFDM transmitter according to the present invention.

Figure 1:
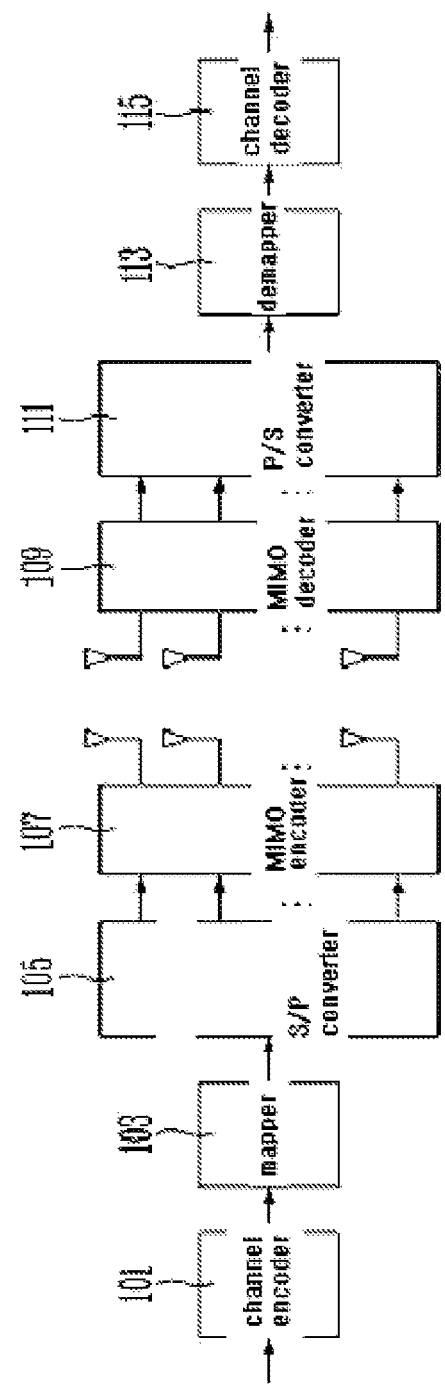
FIG. 1 is a block diagram illustrating an OFDM system equipped with multiple transmission/reception (Tx/Rx) antennas.
Figure 2:
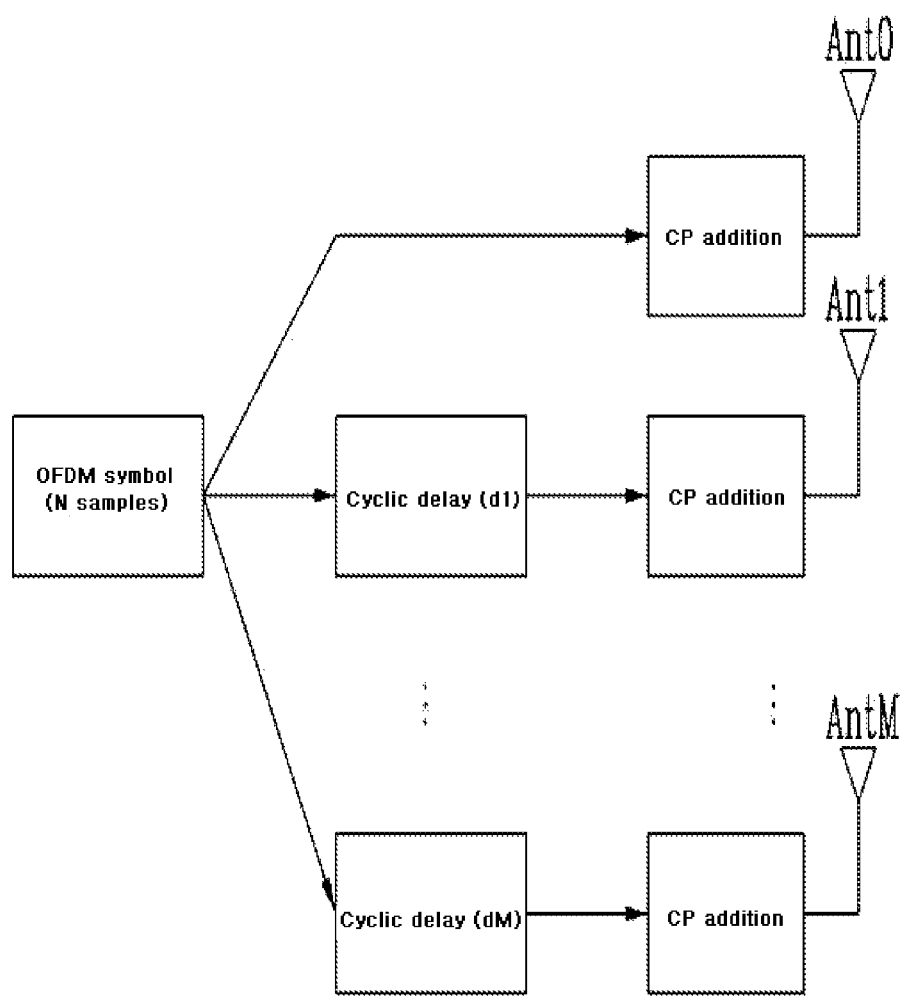
FIG. 2 is a block diagram illustrating a transmission end of a MIMO system based on a conventional Cyclic Delay Diversity (CDD) scheme.
Figure 3:
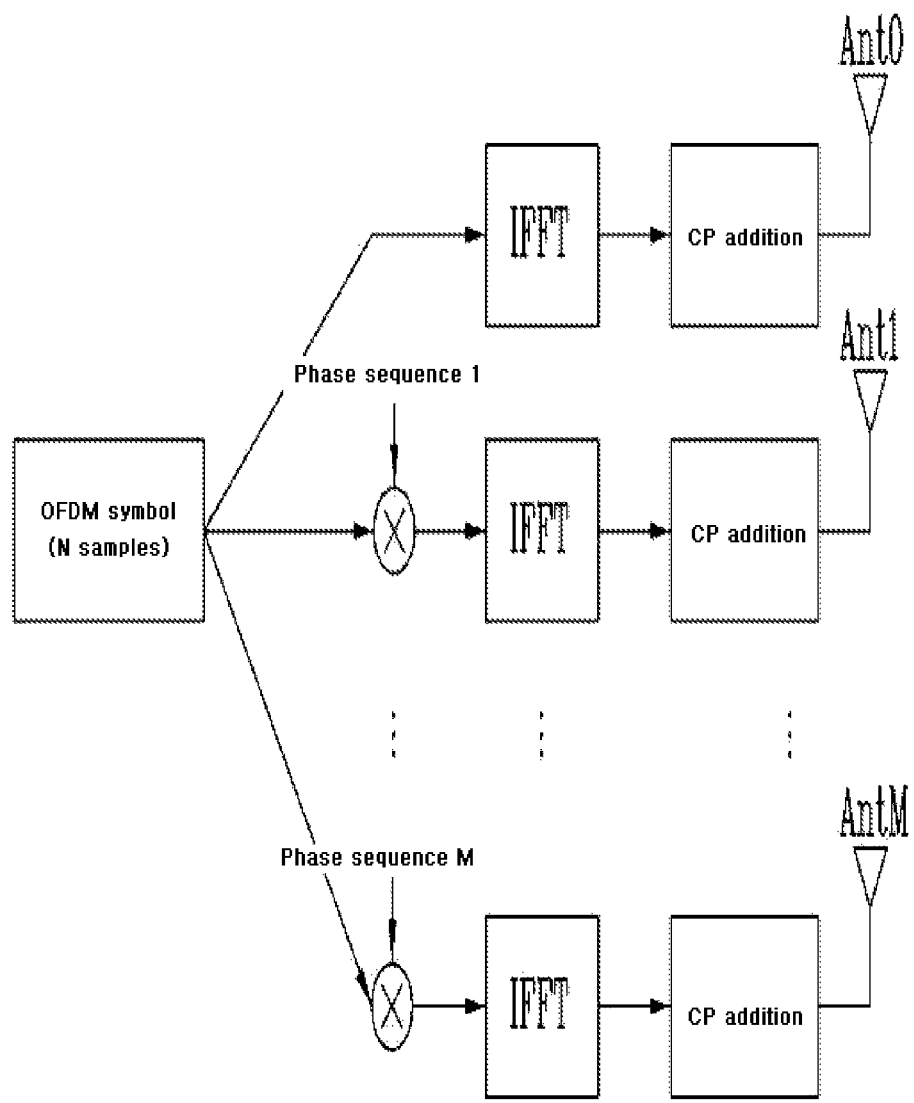
FIG. 3 is a block diagram illustrating a transmission end of a MIMO system based on a conventional phase shift diversity (PSD) scheme.
Figure 4:
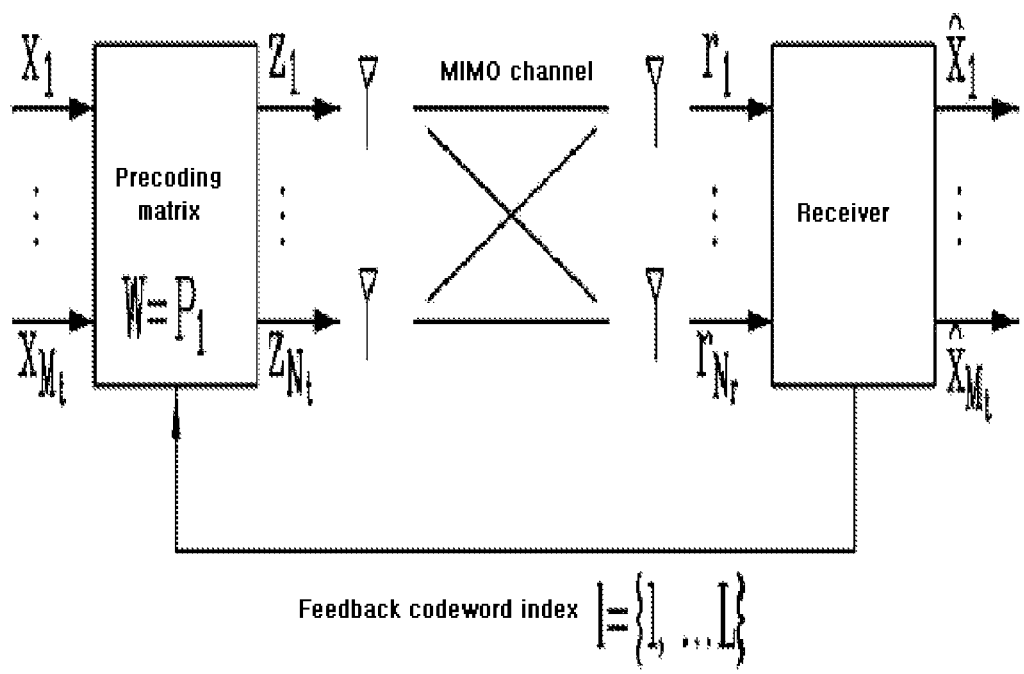
FIG. 4 is a block diagram illustrating a transceiver of a MIMO system based on a conventional precoding scheme.

Referring to FIGS. 7 and 8, channel encoders 510 and 610, interleavers 520 and 620, IFFT (Inverse Fast Fourier Transform) units 550 and 650, and analog converters 560 and 660 and so forth are equal to those of FIG. 1, so that their detailed description will herein be omitted for the convenience of description. Only precoders 540 and 640 will hereinafter be described in detail.

The precoder 540 includes a precoding-matrix decision module 541 and a precoding module 542. The precoder 640 includes a precoding-matrix decision module 641 and a precoding module 642.

The precoding-matrix decision module (541,641) is configured in the form of a first group of Equations 12, 14, and 15 or a second group of Equations 20 and 21, and determines a phase-shift-based precoding matrix. A detailed method for determining the precoding matrix has already been described in the second to fourth embodiments, so that a detailed description thereof will herein be omitted for the convenience of description. The phase-shift-based precoding matrix based on either the first group of Equations 12, 14, and 15 or the second group of Equations 20 and 21 may change a precoding matrix for preventing an interference between sub-carriers, a phase angle of a diagonal matrix, and/or a unitary matrix in time, as shown in Equation 18.

The precoding-matrix decision module (541,641) may select at least one of the precoding matrix and the unitary matrix on the basis of feedback information of a reception end. In this case, it is preferable that the feedback information may include a matrix index of a predetermined codebook.

The precoding module (542,642) performs precoding by multiplying the determined phase-shift-based precoding matrix by a corresponding subcarrier of an OFDM symbol.

A receiving procedure of a MIMO-OFDM system using phase-shift-based precoding is performed with a reversed order of the above explained transmission procedure. The receiving procedure will be briefly explained hereinafter. First, using a pilot symbol for channel estimation, MIMO channel information for a subcarrier by which corresponding data was transmitted is obtained. And then, equivalent channel information is obtained by multiplying the obtained MIMO channel information by the phase-shift-based precoding matrix. Using the obtained equivalent channel information and received signal vector, a data signal, which was processed by a phase-shift-based precoding and then transmitted, is extracted through various MIMO receivers. The extracted data signal is error-corrected by channel decoding process, and then, finally a transmitted data information is obtained. According to each MIMO receiving scheme, this procedure may be repeated, or additional decoding step may be included. More details of a MIMO receiving scheme is not explained herein because the phase-shift-based precoding scheme used in the present invention is not altered or varied according to MIMO receiving scheme.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention provides a phase-shift-based precoding technique for solving the problems of conventional CDD, PSD, and precoding methods, resulting in the implementation of effective communication. Specifically, the phase-shift-based precoding technique is generalized or extended, the design of a transceiver is simplified or the communication efficiency increases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting signals at a transmitter of a Multi-Input Multi-Output (MIMO) system using a plurality of antennas, the method comprising:
encoding input signals of an encoder to output (R) streams of signals, wherein (R) corresponds to a rank predetermined among {R1, R2, . . . , Rm}, wherein (m) is a predetermined integer number;

performing a precoding on the (R) streams of signals at a precoder using a precoding matrix selected from a subset for (R) of a codebook, wherein the subset for (R) comprises ($N^R_{restrict}$) precoding matrices, wherein ($N^R_{restrict}$) is independently determined based on (R); and transmitting the precoded signals to a receiver, wherein:

($N^{Ri}_{restrict}$)≥($N^{Rj}_{restrict}$) when a subset for (Ri) comprises ($N^{Ri}_{restrict}$) precoding matrices and a subset for (Rj) comprises ($N^{Rj}_{restrict}$) precoding matrices;

Ri and Rj∈{R1, R2, ..., Rm}; and

Ri<Rj.

2. The method of claim 1, wherein ($N^2_{restrict}$)=4 and ($N^4_{restrict}$)=1.

3. The method of claim 1, wherein:

each of the ($N^R_{restrict}$) precoding matrices has an index (i), (i)=0, 1, ..., ($N^R_{restrict}$)−1, the selected precoding matrix is selected according to (i)=(s) mod ($N_{restrict}$); and 'mod' indicates a modulo operation, (s) is a variable that changes every (v) contiguous resource indices, and (v) is a predetermined integer value.

4. A transceiver for transmitting signals in a Multi-Input Multi-Output (MIMO) system, the transceiver comprising:

an encoder for encoding input signals to output (R) streams of signals, wherein (R) corresponds to a rank predetermined among {R1, R2, ..., Rm}, wherein (m) is a predetermined integer number;

a precoder for performing a precoding on the (R) streams of signals using a precoding matrix selected from a subset for (R) of a codebook, wherein the subset for (R) comprises ($N^R_{restrict}$) precoding matrices, wherein ($N^R_{restrict}$) is independently determined based on (R); and a plurality of antennas for transmitting the precoded signals to a receiver, wherein:

($N^{Ri}_{restrict}$)≥($N^{Rj}_{restrict}$) when a subset for (Ri) comprises ($N^{Ri}_{restrict}$) precoding matrices and a subset for (Rj) comprises ($N^{Rj}_{restrict}$) precoding matrices;

Ri and Rj∈{R1, R2, ..., Rm}; and

Ri<Rj.

5. The transceiver of claim 4, wherein ($N^2_{restrict}$)=4 and ($N^4_{restrict}$)=1.

6. The transceiver of claim 4, wherein:

each of the ($N^R_{restrict}$) precoding matrices has an index (i), (i)=0, 1, ..., ($N^R_{restrict}$)−1; the selected precoding matrix is selected according to (i)=(s) mod ($N_{restrict}$); and 'mod' indicates a modulo operation, (s) is a variable which that changes every (v) contiguous resource indices, and (v) is a predetermined integer value.

7. A method for receiving signals at a receiver of a Multi-Input Multi-Output (MIMO) system, the method comprising:

receiving the signals, the signal transmitted from a transmitter using a plurality of antennas;

acquiring (R) streams using a precoding matrix selected from a subset for (R) of a codebook, wherein the subset for (R) comprises ($N^R_{restrict}$) precoding matrices, wherein ($N^R_{restrict}$) is independently determined based on (R); and decoding the (R) streams to acquire transmission information at a decoder, wherein:

($N^{Ri}_{restrict}$)≥($N^{Rj}_{restrict}$) when a subset for (Ri) comprises ($N^{Ri}_{restrict}$) precoding matrices and a subset for (Rj) comprises ($N^{Rj}_{restrict}$) precoding matrices;

Ri and Rj∈{R1, R2, ..., Rm}; and

Ri<Rj.

8. The method of claim 7, wherein ($N^2_{restrict}$)=4 and ($N^4_{restrict}$)=1.

9. The method of claim 7, wherein:

each of the ($N^R_{restrict}$) precoding matrices has an index (i), (i)=0, 1, ..., ($N^R_{restrict}$)−1; the selected precoding matrix is selected according to (i)=(s) mod ($N_{restrict}$); and 'mod' indicates a modulo operation, (s) is a variable that changes every (v) contiguous resource indices, and (v) is a predetermined integer value.

10. A transceiver for receiving signals in a Multi-Input Multi-Output (MIMO) system, the transceiver comprising:

a reception antenna for receiving the signals, the signals transmitted from a transmitter using a plurality of transmission antennas;

a MIMO decoder for acquiring (R) streams using a precoding matrix selected from a subset for (R) of a codebook, wherein the subset for (R) comprises ($N^R_{restrict}$) precoding matrices, wherein ($N^R_{restrict}$) is independently determined based on (R); and a decoder for decoding the (R) streams to acquire transmission information, wherein:

($N^{Ri}_{restrict}$)≥($N^{Rj}_{restrict}$) when a subset for (Ri) comprises $N^{Ri}_{restrict}$) precoding matrices and a subset for (Rj) comprises ($N^{Rj}_{restrict}$) precoding matrices;

Ri and Rj∈{R1, R2, ..., Rm}; and

Ri<Rj.

11. The transceiver of claim 10, wherein ($N^2_{restrict}$)=4 and ($N^4_{restrict}$)=1.

12. The transceiver of claim 10, wherein:

each of the ($N^R_{restrict}$) precoding matrices has an index (i), (i)=0, 1, ..., ($N^R_{restrict}$)−1; the selected precoding matrix is selected according to (i)=(s) mod ($N_{restrict}$); and 'mod' indicates a modulo operation, (s) is a variable which that changes every (v) contiguous resource indices, and (v) is a predetermined integer value.

* * * * *